US011023639B2

United States Patent
Stokbro et al.

(10) Patent No.: US 11,023,639 B2
(45) Date of Patent: Jun. 1, 2021

(54) SYSTEMS AND METHODS FOR PROVIDING APPROXIMATE ELECTRONIC-STRUCTURE MODELS FROM CALCULATED BAND STRUCTURE DATA

(71) Applicant: Synopsys, Inc., Mountain View, CA (US)

(72) Inventors: Kurt Stokbro, Farum (DK); Mattias Palsgaard, Copenhagen (DK)

(73) Assignee: Synopsys, Inc., Mountain View, CA (US)

( * ) Notice: Subject to any disclaimer, the term of this patent is extended or adjusted under 35 U.S.C. 154(b) by 612 days.

(21) Appl. No.: 15/865,076

(22) Filed: Jan. 8, 2018

(65) Prior Publication Data
US 2018/0129765 A1 May 10, 2018

Related U.S. Application Data

(63) Continuation-in-part of application No. PCT/EP2016/064628, filed on Jun. 23, 2016.

(60) Provisional application No. 62/188,959, filed on Jul. 6, 2015.

(51) Int. Cl.
*G06F 30/367* (2020.01)

(52) U.S. Cl.
CPC .................. *G06F 30/367* (2020.01)

(58) Field of Classification Search
CPC ..... G06F 30/23; G06F 30/367; G06F 2111/10
USPC ............................................................ 703/2
See application file for complete search history.

(56) References Cited

U.S. PATENT DOCUMENTS

| 5,694,343 A | 12/1997 | Nobutoki | |
|---|---|---|---|
| 2006/0091284 A1* | 5/2006 | Viens | H01L 27/14652 250/201.9 |
| 2009/0117002 A1* | 5/2009 | Kotov | G01N 33/588 422/400 |
| 2011/0313741 A1* | 12/2011 | Langhoff | G16C 20/30 703/2 |

OTHER PUBLICATIONS

Brezini, A., and M. Sebbani. "Effective mass theory for abrupt heterostructures." physica status solidi (b) 178.1 (1993). pp. 141-149. (Year: 1993).*

(Continued)

*Primary Examiner* — Kamini S Shah
*Assistant Examiner* — John E Johansen
(74) *Attorney, Agent, or Firm* — Haynes Beffel & Wolfeld LLP; Warren S. Wolfeld; Andrew L. Dunlap

(57) ABSTRACT

Computer-aided methods for simulating confined nanodevices are disclosed. In example implementations, atomic-scale model of the nanodevices are generated so that dimensions and materials are specified. Then, band structures which comprise wave functions and Eigen energies are calculated using First Principles Methods (FPM). Effective mass modeled which comprise wave functions and Eigen energies are generated. After that, spatial wave functions of the calculated FPM band structures are mapped to the generated effective mass band structures wave functions by considering global behavior. In response to the mapping, generated effective mass models are fitted to calculated FPM energies so that approximate electronic band structures of the confined nanodevices are modeled. Computer programs for carrying out the methods, data media and computer systems are also disclosed.

33 Claims, 13 Drawing Sheets

(56) References Cited

OTHER PUBLICATIONS

Xi, Jinyang, et al. "Tunable electronic properties of two-dimensional transition metal dichalcogenide alloys: a first-principles prediction." The journal of physical chemistry letters 5.2 (2014). pp. 285-291. (Year: 2014).*
Tanaka, K., and N. Kotera. "Electron effective mass determined from experimental electron eigen-energies in InGaAs/InAlas multi-quantum wells." 2008 20th International Conference on Indium Phosphide and Related Materials. IEEE, 2008. pp. 1-4. (Year: 2008).*
PCT/EP2016/064628—International Search Report and Written Opinioin dated Apr. 11, 2016, 14 pages.
Vasileska et al., "Computational electronics," Materials Science and Engineering: R: Reports 38, No. 5 (2002): 181-236.
Tomasulo et al., "Quantum Confinement Effects in Semiconductor Clusters II," eprint arXiv: chem-ph/9506001. 1995, 14 pages.
Xu et al., "Electronic structures of wurtzite ZnO, BeO, MgO and p-type doping in Zn1—xYxO (Y=Mg, Be)," Computational Materials Science 44, No. 1 (2008): 72-78.
Rideau et al., "On the validity of the effective mass approximation and the Luttinger kp model in fully depleted SOI MOSFETs," Solid-State Electronics 53, No. 4 (2009): 452-461.
Souza et al., "Maximally localized Wannier functions for entangled energy bands," Physical Review B 65, No. 3 (2001), 14 pages.

* cited by examiner

| $P_{n,k=0}^{m,n_0=0}$ | m=1 | m=2 | m=3 |
|---|---|---|---|
| n=1 | 4e-5 | 5e-3 | 6e-4 |
| n=2 | 1e-3 | 2e-3 | 1e-4 |
| n=3 | 9e-4 | (0.46) | 1e-3 |
| n=4 | 0.04 | 2e-3 | 1e-4 |
| n=5 | 0.03 | 3e-3 | 9e-4 |
| n=6 | (0.40) | 7e-5 | 3e-4 |
| n=7 | 6e-4 | 7e-4 | 5e-3 |
| n=8 | 1e-3 | 3e-3 | 7e-6 |
| n=9 | 3e-5 | 4e-4 | 0.04 |

Fig. 3d

| $P_{n,k=0.15}^{m,n_0=0}$ | m=1 | m=2 | m=3 |
|---|---|---|---|
| n=1 | (0.33) | 2e-4 | 3e-5 |
| n=2 | 8e-4 | (0.43) | 2e-3 |
| n=3 | 0.01 | 0.05 | 3e-5 |
| n=4 | 9e-4 | 0.03 | 1e-6 |
| n=5 | 3e-7 | 1e-3 | 2e-4 |
| n=6 | 2e-4 | 2e-3 | 2e-5 |
| n=7 | 9e-7 | 1e-3 | 1e-3 |
| n=8 | 1e-4 | 4e-4 | 2e-3 |
| n=9 | 7e-5 | 4e-6 | 7e-3 |

Fig. 3e

SYSTEMS AND METHODS FOR PROVIDING APPROXIMATE ELECTRONIC-STRUCTURE MODELS FROM CALCULATED BAND STRUCTURE DATA

CROSS-REFERENCE TO OTHER APPLICATIONS

This application is a Continuation-in-Part of International Application No. PCT/EP2016/064628, entitled "SYSTEMS AND METHODS FOR PROVIDING APPROXIMATE ELECTRONIC STRUCTURE MODELS FROM CALCULATED BAND STRUCTURE DATA," filed Jun. 23, 2016, which claims the benefit of U.S. Provisional Application No. 62/188,959, entitled "SYSTEM AND METHOD FOR PROVIDING APPROXIMATE ELECTRIC-STRUCTURE MODEL EXTRACTION FROM CALCULATED BAND STRUCTURE DATA," filed 6 Jul. 2015, which applications are incorporated herein by reference in their entirety.

BACKGROUND

Technology Computer Aided Design (TCAD) tools are used for simulating electronic devices at the transistor level. A typical electronic device is a FinFET or a nanowire transistor. These devices have three terminals: source, drain and gate. The voltage (V gate) at the gate terminal controls the source-drain current (I).

The purpose of the simulations is to predict the 1-V gate characteristics of different device designs and materials. Such simulations require a plurality of parameters that describe the material properties of the device. One of the most important material properties in a device is its band structure. The band structure describes the relation between the electron momenta and electron energy for the material properties of the device. A common approximation for the device band structure is the effective mass approximation, where the band structure is described by a second order polynomial around the band minimum. This may be written as:

$$\varepsilon_{nk} = \frac{^2(k_x - k_{x0})^2}{2m_x^*} + \frac{^2(k_y - k_{y0})^2}{2m_y^*} + \frac{^2(k_z - k_{z0})^2}{2m_z^*} + \varepsilon_{nk_0}, \quad (1)$$

where $\varepsilon_{nk}$ is the electron energy of band number n, $(k_x, k_y, k_z)$ is the electron wave vector, is the reduced Planck constant, $\varepsilon_{nk_0}$ is the energy of the band minimum, $(k_{x0}, k_{y0}, k_{z0})$ is the wave vector of the band minimum, and $(m_x^*, m_y^*, m_z^*)$ are the anisotropic effective masses. Different variants of the effective mass approximation include deviations from the second order polynomial approximation through non-parabolicity effects.

Commonly, the effective mass model for a device is obtained by fitting the parameters of the polynomial to the device material band structure when the material is in an infinite periodic crystal. This infinite periodic crystal is also called "bulk material." The band structure of a bulk material can either be calculated using electronic structure methods such as Density Functional Theory (DFT), or obtained experimentally, e.g., using photoemission or inverse photoemission.

SUMMARY OF THE INVENTION

The present disclosure relates to band structure calculations obtainable using electronic structure methods and to the extraction of approximate band structure models from the calculations.

In a nanoscale device, the electrons are confined by the device geometry, and the confinement changes the band structure of the electrons; this is called a confined system or confined device, which is periodic at least in one direction. Therefore, the values of the effective mass and non-parabolicity parameters determined from a bulk system, cannot be used to construct an accurate description of the confined device. It can be very difficult, costly, and sometimes impossible, to obtain reliable experimental data for such parameters for relevant device geometries, e.g., a confined nanodevice.

An alternative approach may be generating band structure data using atomic-scale modeling, e.g., First Principles Methods (FPM). One could also use semi-empirical tight-binding methods. The FPM attempts to solve the basic Quantum Mechanical equations, i.e., the Schrödinger Equation, of the system without using any empirical parameters. However, it is not possible to solve the Quantum Mechanical equations exactly, and so a number of different approximations exist. The most popular approximation is Density Functional Theory (DFT). The semi-empirical methods are a simplified version of the FPM, i.e., a number of empirical parameters are introduced. These parameters are determined such that the model gives a good description of the band structure in a number of reference systems.

For complex nanoscale devices, the calculated band structure data can be very complex, and it can be difficult to extract an effective mass description as needed for the TCAD tools. The use of atomic-scale modeling has become a standard tool for generating TCAD parameters, and consequently, there is a need for robust and automatized procedures for extracting effective mass models from atomic-scale band structure data.

Extracting an effective mass model from the calculated band structure of a bulk system is a standard fitting procedure. However, extracting the effective mass model from a confined system may be complex. In a confined device with at least one transport direction, the electron momentum has a continuum of values along the transport direction, i.e., the direction on which the electron must travel to move from the source to the drain electrode. In the remaining directions perpendicular to the transport direction, the system is said to be confined. In those perpendicular directions, i.e., the confined directions, the electron momentum has discrete values. Each discrete value of the electron momentum in a confined direction gives rise to a plurality of sub-bands in the transport direction. Consequently, the effective mass band structure model may be defined by several sub-bands. These series of sub-bands are called band ladders. There may be several effective mass band ladders in the band structure of a confined system. Each ladder is related to a single electronic band of the corresponding bulk system and described by a separate effective mass model. Therefore, band ladders may be interleaved, resulting in a complex device band structure complex. There is currently no known system or method which can take the interleaved band structure of a confined device and construct an effective mass model that reproduces it.

In a first aspect, a computer-aided method for simulating a confined nanodevice is provided. Firstly, an atomic-scale model specifying a position and element type of each individual atom of the confined nanodevice may be generated from a target device geometry. The target device geometry indicates dimensions and materials of the confined nanodevice. Secondly, a band structure comprising wave functions and Eigen energies may be calculated by the FPM. Then, an effective mass model comprising wave functions and Eigen energies may be generated. Afterwards, the spatial wave functions of FPM and effective mass wave functions may be mapped to each other. In response to such mapping, parameters may be fitted by curve fitting, i.e., a process of constructing a curve or mathematical function that has the best fit to a series of data points, to fit generated effective mass model Eigen energies to FPM Eigen energies so that an approximate electronic band structure of the confined material may be modeled.

The implementation of methods according to this aspect enables the identification of the interleaved band ladders of confined nanodevices and therefore, a more precise band structure for TCAD tools simulation may be obtained. Additionally, the method provides an accurate description of the confined nanodevice around the band minimum. By using this method, a simulation as fast as one performed with TCAD tools and as accurate as one performed with DFT simulations may be achieved.

In some examples, the mapping step comprises providing Eigen energies and wave functions of both the FPM band structure and the effective mass model and then, matching an unmatched FPM wave function with an effective mass wave function. The matching step may be repeated until all relevant bands are matched. Finally, a list where each unmatched FPM wave function is matched with an effective mass wave function may be returned.

In some examples, the matching step may comprise identifying a lowest energy FPM wave function which is not matched and also identifying a lowest energy effective mass wave function. Then, an FPM wave function with the same local atomic behavior as the unmatched FPM wave function with the lowest energy and global behavior of another effective mass wave function may be identified.

In a second aspect, a computer program for carrying out a method in accordance with any of the preceding examples is provided. The computer program may be embodied on a data medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the method. The carrier may be any entity or device capable of carrying the computer program.

For example, the carrier may comprise a non-transitory storage medium, such as a ROM, for example, a CD ROM or a semiconductor ROM, or a magnetic recording medium, for example, a hard disk.

Alternatively, the carrier may be an integrated circuit in which the computer program is embedded, the integrated circuit being adapted for performing, or for use in the performance of, the relevant methods.

In a third aspect, a computer system on which a computer program according to an example is loaded. The computing system may comprise a memory and a processor, embodying instructions stored in the memory and executable by the processor, the instructions comprising functionality to execute a method of simulating a confined nanodevice according to some examples disclosed herein.

The implementation of such systems provides robust and automatized procedures for extracting effective mass models from atomic-scale modeling, which may be used to simulate band structure data.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 3d and 3e show projection function values for different effective mass bands and density functional theory bands where the highest value of each case is circled.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The present invention is directed to a system and method for extracting an approximate band structure model from an atomic-scale band structure calculation of a confined system. The confined systems of most relevance to this invention are nanoscale devices, for instance, the Fin of a Fin Field Effect Transistor (FinFET) device. Such a Fin consists of a material, for instance, Silicon, with nanoscale dimensions in two directions, the confined directions. The aim is to construct an effective mass model (or similar approximate band structure model) for the electronic structure of the confined system, e.g., the Fin of the FinFET, which can be used for a TCAD simulation of the confined system, e.g., the Fin of the FinFET. The invention is a method for constructing such an approximate band structure in an automated way from an atomic-scale band structure calculation using first principles methods or semi-empirical methods.

The standard approach for generating an approximate band structure model for a confined nanosystem is to use parameters generated for a bulk system. The bulk system is periodic in all directions and therefore has a high symmetry. Due to the high symmetry, there are only a few bands. Also, it is relatively simple to fit an effective mass model to the band structure.

A confined system, as a consequence of the confinement, has a much more complex band structure, which consists of series of interleaved sub-bands which form ladders. The invention describes an automated method for mapping these sub-bands into, different effective mass ladders.

Figure 1:
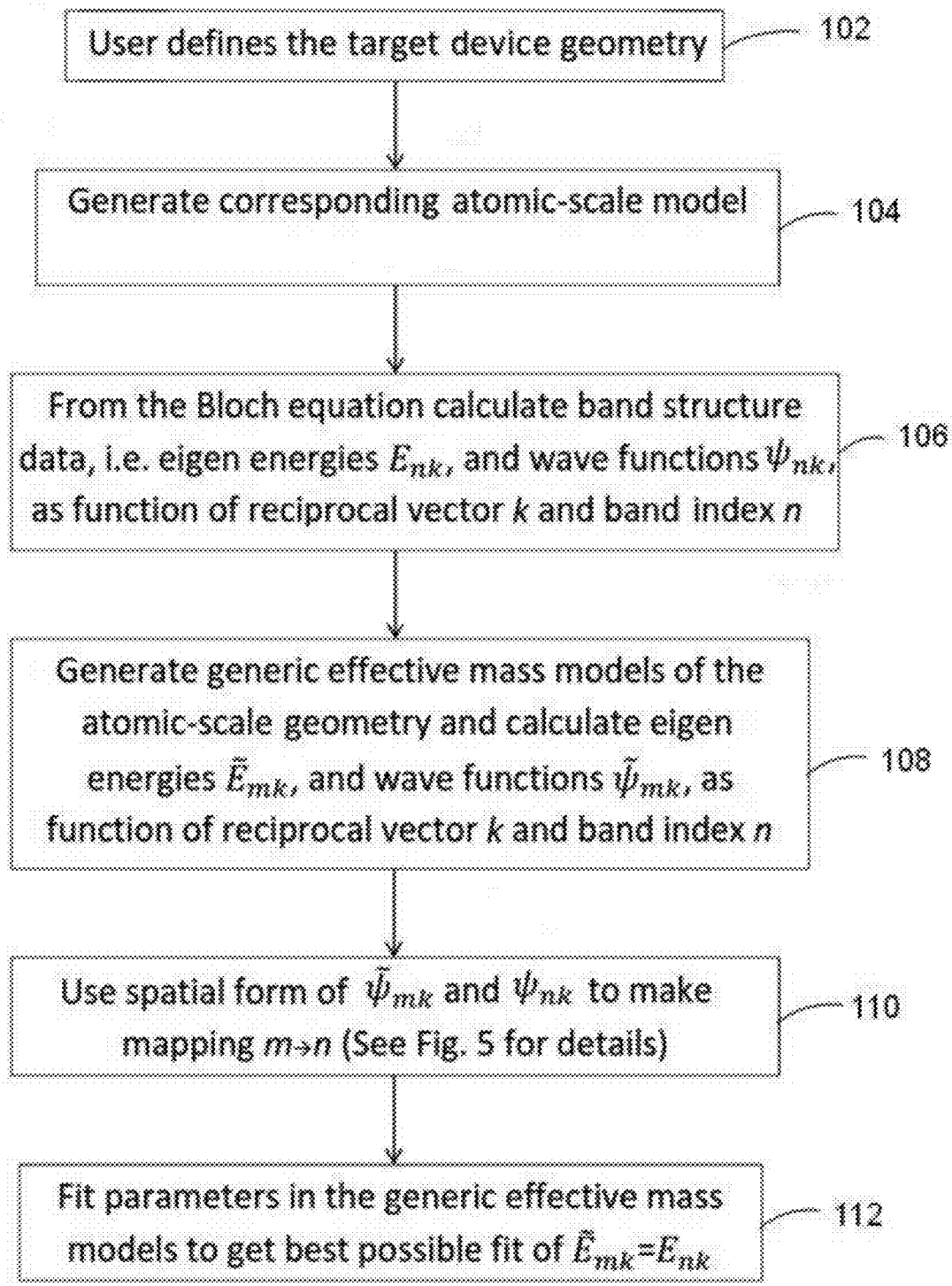
FIG. 1 is a flow diagram illustrating a method to obtain an approximate band structure model from an accurate atomic-scale band structure calculation according to an embodiment.
Figure 2:
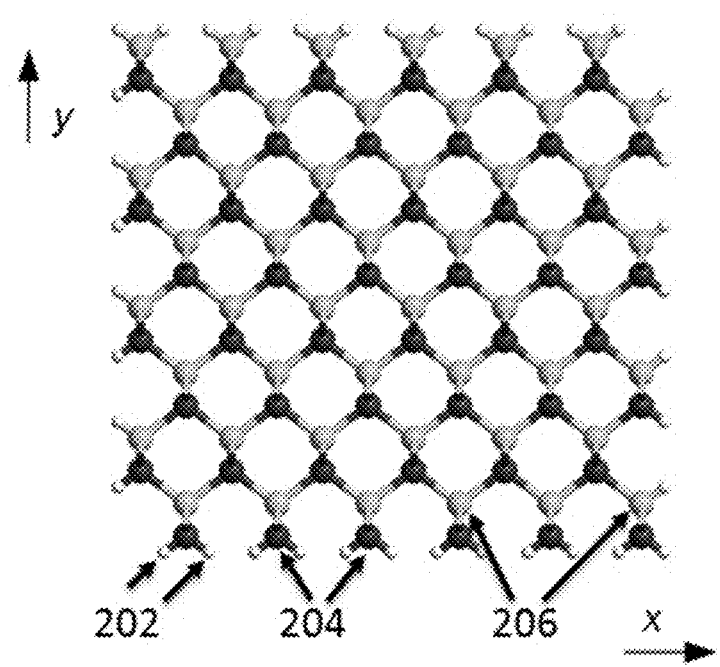
FIG. 2 illustrates an atomic-scale structure of a 1-dimensional nanodevice geometry according to an embodiment.

FIG. 1 is a flow diagram illustrating method to obtain an approximate band structure model from an accurate atomic-scale band structure calculation. The objective is the generation of an approximate band structure model for a user defined device geometry using atomic-scale simulations. The steps in the algorithm will be illustrated for a particular 1-dimensional confined system, a 3×3 nm Indium-Arsenic nanowire. The atomic-scale model of the nanowire cross-section is shown in FIG. 2. Items 202 are Hydrogen atoms, items 204 are Indium atoms and items 206 are Arsenic atoms. The Indium or Arsenic atoms positioned at the surface of the device do not have neighbor atoms in all directions. In the directions where a neighbor is missing, they are bonded with a Hydrogen atom. Such passivation of the atoms is a standard procedure for the atomic-scale model to better describe the experimental situation where the nanowire will be capped with some material that will passivate the surface atoms. The invention is not limited to this system, but can be used for 1-dimensional nanowires of any other suitable dimensions and materials, or 2-dimensional nanoscale systems which are confined in one or more directions, or any other suitable N-dimensional nanoscale systems.

In FIG. 1, the method starts at step 102 where the user inputs the target device geometry. In step 104, the target geometry is converted into an atomic-scale model. Typically, the target device geometry will specify dimensions and materials of the device, while in the atomic-scale model, the position and element type of each individual atom in the device is specified. The example of an Indium-Arsenic nanowire atomic-scale model is shown in FIG. 2.

FIG. 2 shows a cross-section of an example nanoscale device, an Indium-Arsenic nanowire. The horizontal axis may be defined as x and the vertical axis may be defined as y, the device is confined in two directions. The planar structure would be repeated along the z axis, perpendicular to the xy plane.

The nanowire of FIG. 2 alternates eight horizontal rows, each row comprising six Indium atoms with eight horizontal rows each row comprising six Arsenic atoms. Each Arsenic atom is bonded to four Indium atoms, and each Indium atom is bonded to four Arsenic atoms. The extremes of the nanowire are bonded to Hydrogen atoms, thus defining the confinement of the nanowire.

Returning to FIG. 1, step 106 performs a band structure calculation of the device. For this purpose, the Hamiltonian of the confined device, e.g., an Indium-Arsenic nanowire, may be constructed using either FPM or semi-empirical methods. The effective potential of the confined device is also calculated. A Hamiltonian describes the coupling between different electron orbitals at different atoms. The confined device, e.g., the nanowire of FIG. 2, may be described as periodic in at least one direction, i.e., the perpendicular direction to the confinement direction in FIG. 2. In the periodic direction, the Bloch theorem is used to Fourier transform the Hamiltonian, such that the electrons would be described in momentum space instead of real space in this direction. We can then write the Bloch equation as follows:

$$H_k \psi_{nk} = \varepsilon_{nk} \psi_{nk}, \quad (2)$$

where $H_k$ is the k component of the Fourier transformed Hamiltonian, and $\psi_{nk}$, $\varepsilon_{nk}$ are the wave function and energy of band n, respectively.

Figure 3A:
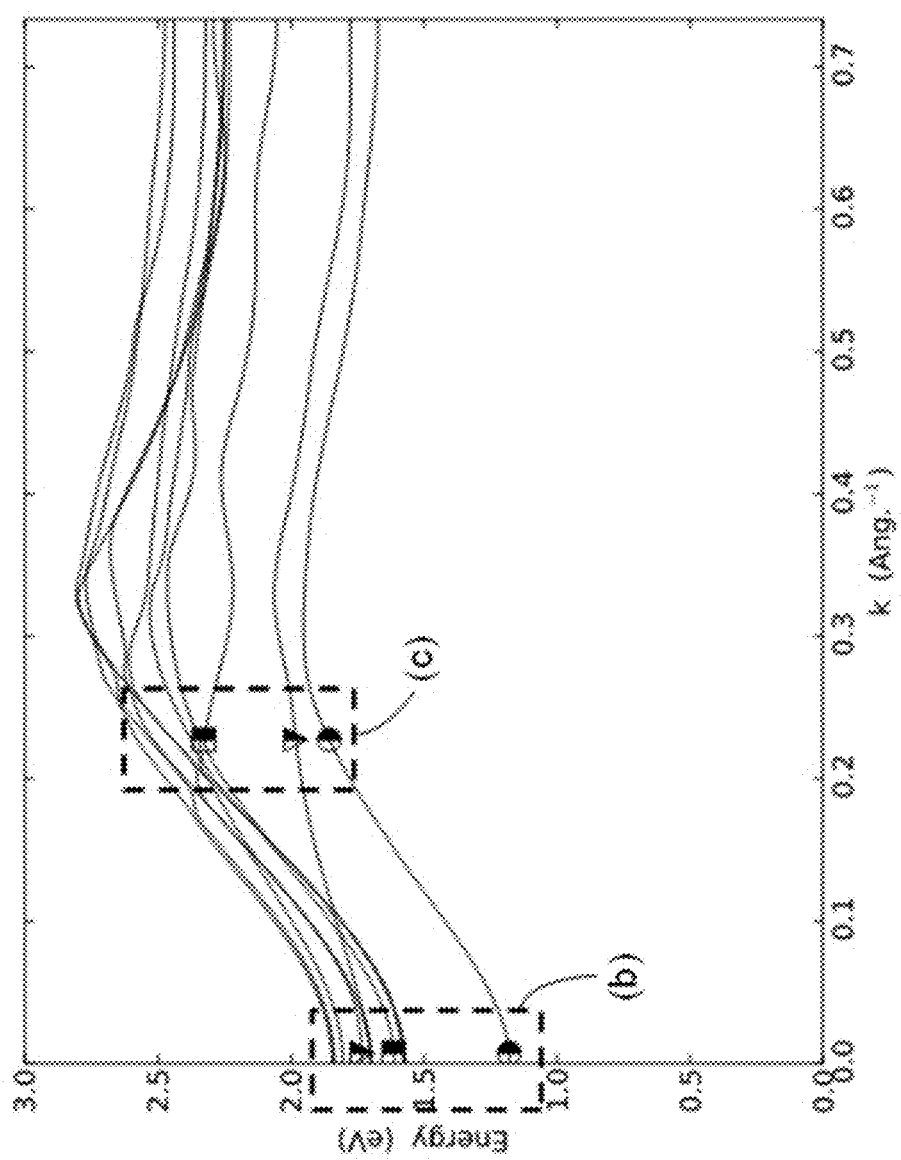
FIG. 3a shows a density functional theory band structure calculation of the nanodevice geometry in FIG. 2.
Figure 3B:
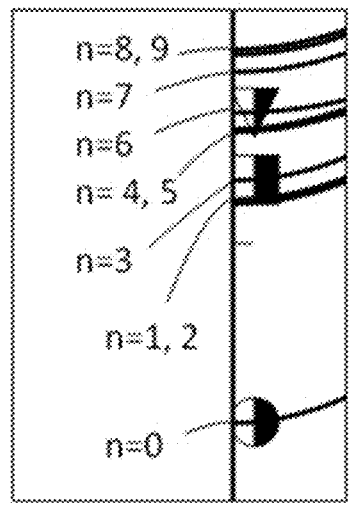
FIGS. 3b and 3c show amplified portions of FIG. 3a for different electron momenta.
Figure 3C:
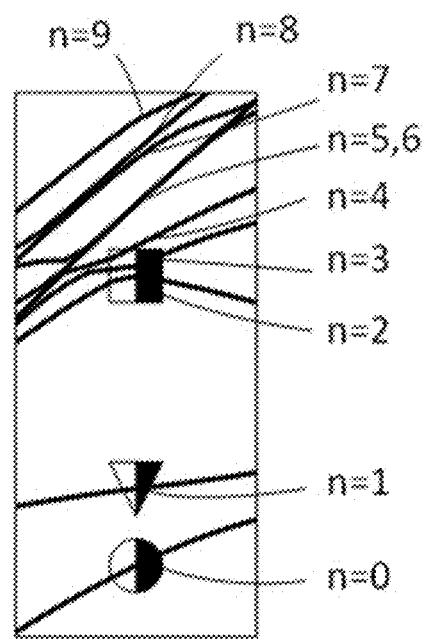

The energy-momentum relation is called the band structure. The band structure of ten of the conduction bands of the geometry of FIG. 2 is shown in FIG. 3a. The conduction bands are the bands that are not occupied by an electron, and these bands are most relevant for electron transport. The horizontal axis is the electron momentum (k) and the vertical axis is the electron energy. Each line represents a different DFT band and circles, triangles and squares represent bands matched with sub-bands m=0, m=1 and m=2 respectively, of an effective mass ladder. Areas of the graph have been amplified in FIGS. 3b and 3c and several DFT bands have been labeled in the amplified figures according to their index numbers n. The DFT index numbers n are ordered according to increasing energy. Generally, the bands used for the matching may be the ones having an energy over a number of eVs, e.g., up to 1.2-1.5 eV, above the lowest energy for any momentum. In FIGS. 3a-3c, the n indexing is sorted according to the energy values at each momentum.

The plot of FIG. 3a shows the ten lowest energy conduction bands from the band structure of the confined device but does not identify the ladders resulting from the confinement. The identification of such ladders will be explained later on in relation with FIGS. 7a-7c.

The band structure in FIG. 3a is calculated using DFT, but may also be calculated with any other suitable approach or combination of approaches, e.g., a semi-empirical tight-binding method. The DFT method is an FPM approach, i.e., without adjustable parameters, while a semi-empirical model has a number of adjustable parameters. FIG. 3a also shows six points which are matched to an effective mass band.

Step 108 generates an effective mass model of the confined device. This model does not need the atomic-scale model, but a confinement potential, which defines how the electrons are confined inside the device. In other words, said effective mass model may not be generated by the parameters of the atomic-scale model but by a confinement potential together with a generic effective mass model. Said confinement potential can, for example, be obtained from the effective potential of the FPM calculation, by smoothing out the atomic-scale details. The smoothing can, for example, be done by averaging the potential at a given grid point with the potential in the surrounding points. Such smoothed confinement potential of the atomic-scale model of FIG. 2 is illustrated in FIG. 4.

Figure 4:
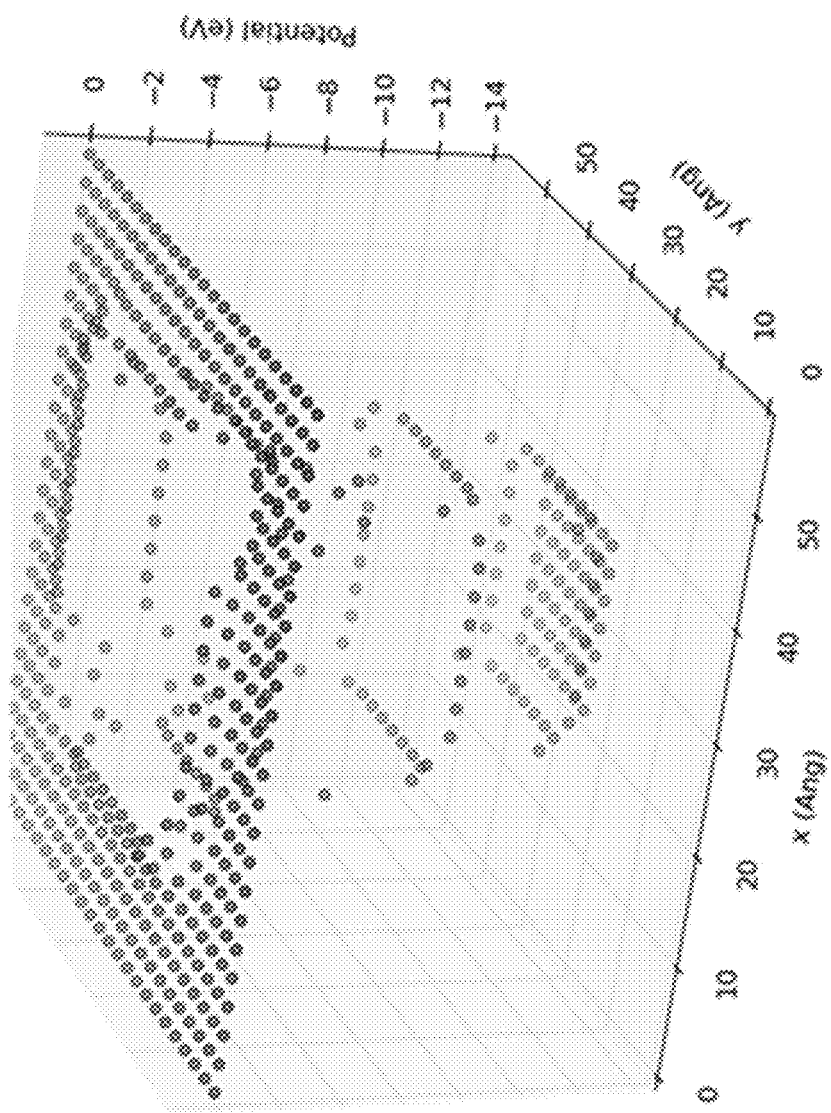
FIG. 4 illustrates the smoothed confinement potential used to generate the effective mass model of the structure in FIG. 2 according to an embodiment.

FIG. 4 shows the value of the smoothed confinement potential for different values of the spatial coordinates x and y. The potential is given on a set of grid points and the value at a given grid point is given as a dot. The smoothed confinement potential together with a generic effective mass model defines an effective mass model Hamiltonian, $\tilde{H}_k$. The exact value of the parameters in the generic effective mass model are not so important, the parameters generated for a bulk system may be used. The effective mass Hamiltonian $\tilde{H}_k$ may now be diagonalized to generate effective mass wave functions $\tilde{\psi}_{mk}$ and energies $\tilde{\varepsilon}_{mk}$.

Step 110 of FIG. 1 is to map each band of the FPM, e.g., DFT band structure model with a specific band of the effective mass band structure model.

A single effective mass model may not generate all the bands in a DFT band structure, but only a subset of the bands called a ladder. In the current example, conduction bands of the confined system (the bands illustrated in FIG. 3a) may be mapped with the bands in the effective mass model.

Figure 5:
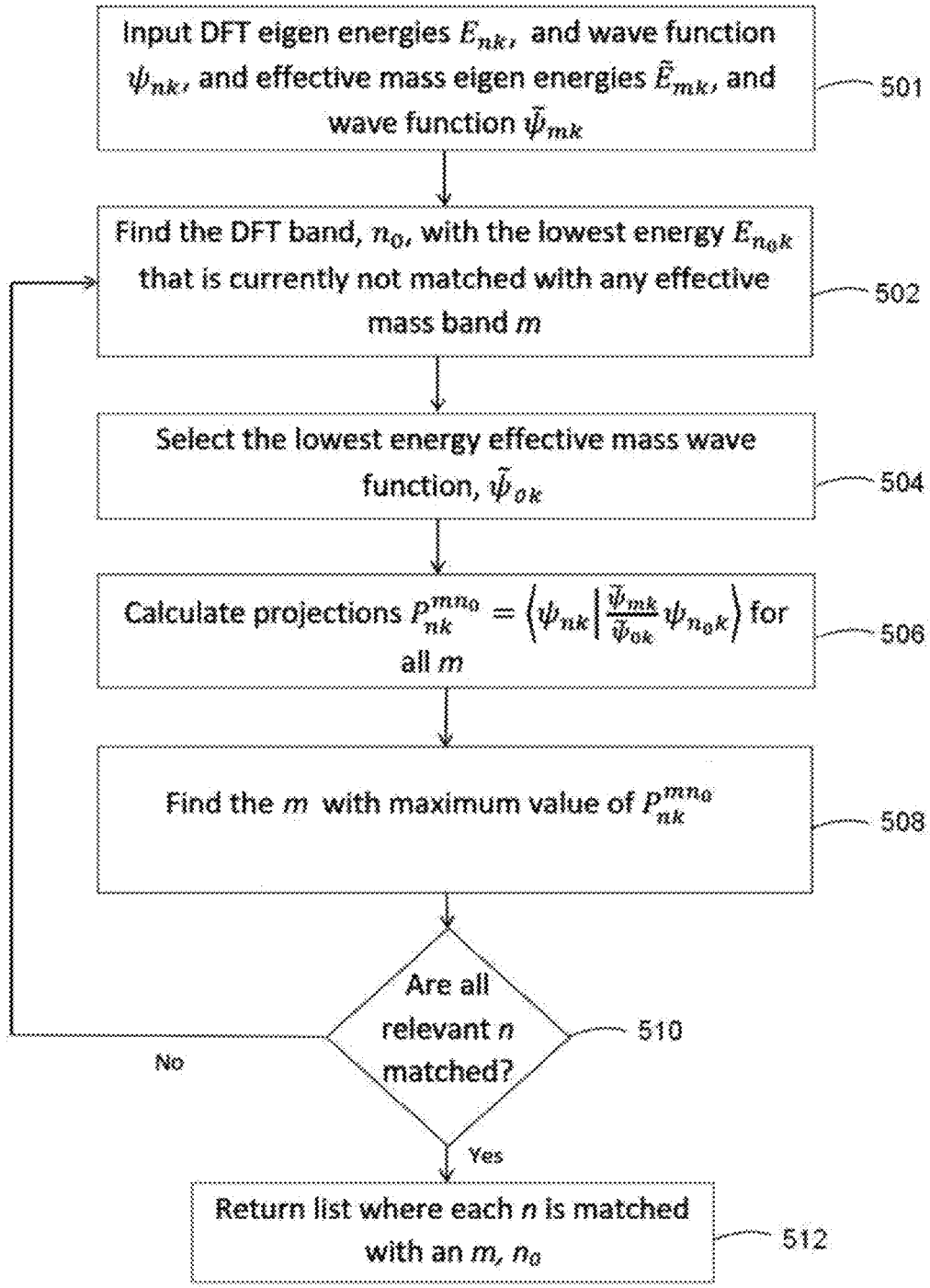
FIG. 5 shows a flow diagram of mapping density functional theory bands with bands in the effective mass model, according to an embodiment.

The procedure for performing step 110 is detailed in the method shown in FIG. 5. Step 501 shows the input for the matching, the energies and spatial wave functions from the DFT band structure and the effective mass model. Step 502 is to select the lowest energy DFT band not yet matched; for the first iteration this will simply be the lowest energy conduction band. Step 504 is to select the lowest energy effective mass wave function which in the first iteration will correspond to the lowest energy band of all the effective mass bands. This lowest energy effective mass band is matched with the lowest energy DFT band selected in step 502. The objective of the algorithm is to match each of the remaining effective mass bands with a DFT band. For this purpose, a projector function, $P_{nk}^{mm_0}$, is introduced in step 506. The aim of the projector function is to find the DFT wave function, $\psi_{nk}$, which has the same relative changes to $\psi_{n_0k}$ as $\tilde{\psi}_{mk}$ has to. Thus, the aim is to find the DFT wave function which best fulfills the following equation:

$$\frac{\psi_{nk}}{\psi_{n_0k}} = \frac{\tilde{\psi}_{mk}}{\tilde{\psi}_{0k}} \qquad (3)$$

For this purpose, a trial wave function, $$\psi_{mkn_0}^{trial} = \frac{\tilde{\psi}_{mk}}{\tilde{\psi}_{0k}} \psi_{n_0k},$$

may be constructed. Said trial wave function will have the same local atomic behavior as $\psi_{n_0k}$, but the global behavior of the effective mass wave function $\tilde{\psi}_{mk}$. Said trial wave function may be projected onto all the DFT wave functions, $\psi_{nk}$, to obtain the projector function $P_{nk}^{mm_0} = \langle \psi_{nk} | \psi_{mkn_0}^{trial} \rangle$. The result of the projector function is a dot product. The projector function, reports each overlap in a matrix form. The overlap may be a number between 1 and 0 that specifies how much two wave functions resemble each other. For example, two identical wave functions overlap would be 1. The DFT wave function with maximum $P_{nk}^{mm_0}$ value is the one that most closely matches the trial wave function, and thus best fulfills Eq. (3).

FIGS. 3d and 3e show two tables with overlaps of nine different wave functions (n) with three different trial functions (m). The overlap for n=0 wave function and m=0 trial function is not calculated because they are automatically matched. Each table corresponds to a different electron momentum (k), that of FIG. 3d corresponds to k=0 and that of FIGS. 3e to k=0.22. In both figures, the highest overlap value has been highlighted by a circle. Said overlaps are accepted as a match when the largest value is larger than the second largest value by a user defined factor, e.g., 1.5 times.

FIG. 3d shows the matrix of the projection values at k=0, for 9 DFT bands and 3 trial functions. The DFT bands correspond to the bands shown in FIG. 3a. The highlighted value 0.46, which is larger than the other printed values, shows a match between m=2 and n=3 represented in FIG. 3a by a square. This means that the effective mass band which best fits the DFT band n=3 would be m=2. The other highlighted value, 0.40, identifies the match of n=6 into m=1 represented by a triangle in FIG. 3a. This means that the effective mass band m=1 is the one which best fits the DFT band n=6.

FIG. 3e shows the matrix of the projection values for 9 DFT bands and 3 trial functions at k=0.15. The overlap values correspond to k=0.22 l/Ang after converting normalized units into 1/Ang. The marked overlap values 0.33 and 0.43 correspond to the triangle and the square highlighted in FIG. 3a. Said values identify two matches, the first one fits n=1 into m=1 and the second one fits n=2 into m=2.

Indeed, the values used to do the matching are values of projections around minimum energy value for all k. In the case of an Indium-Arsenic nanowire, the matching is done around k=0 because this is where the minimum energy occurs. However, in case of other materials, e.g., Silicon, the matching may not be around k=0 but around a different value of k. The matching is done around where the band minimum occurs because the fitting of a second order polynomial function, will only be accurate in those areas around the band minimum energy. The values of FIG. 3e are within the k range limitations for an accurate effective mass band matching for this example.

The maximum projection values identified for both k values are highlighted in FIG. 3a, e.g., when k=0 (FIG. 3d) the best fit for n=3 is given by $P_{nk}^{mm_0}$=0.46 and therefore m=2 is matched to n=3. The circles identify the overlap for effective mass band m=0, triangles identify the overlap for band m=1 and squares identify the overlap for band m=2.

In either case, none of the DFT wave function are matched to the m=3 trial wave function, which means that m=3 wave function does not fit with any of the 10 considered DFT bands. Both tables illustrate how the matching number (n) of a trial function (m) may change for different k when the bands are interleaved in the band structure. In both cases the n0=0 which means that these matched points are the same sub-band(s) of the same ladder at different electron momentum (k).

The process may be repeated for various values of k around the band minimum, and the result may be the matching of all effective mass ladders into different DFT bands.

Figure 6:
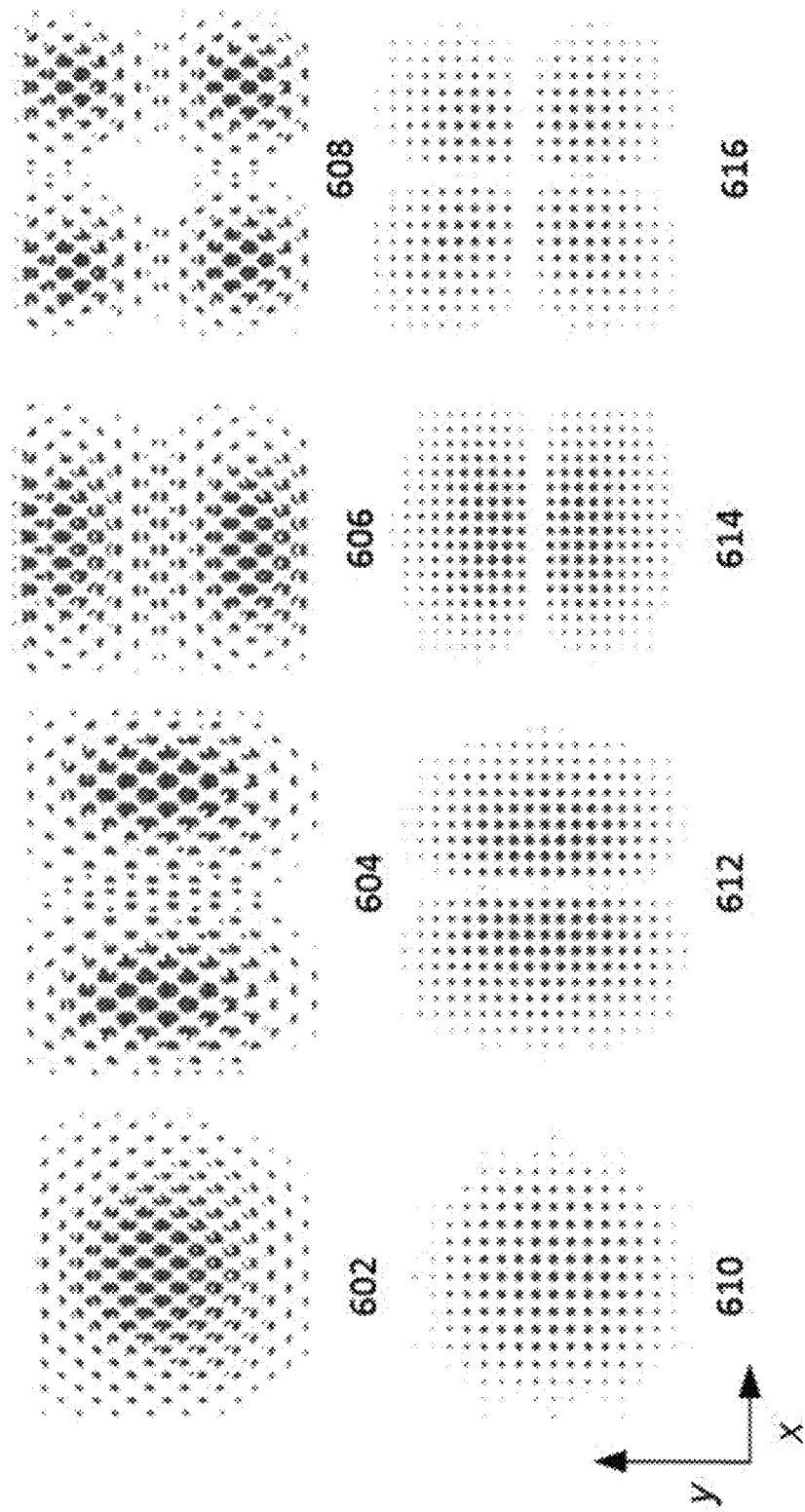
FIG. 6 illustrates real space wave functions calculated with the density functional theory model and with the effective mass model in accordance with an embodiment.

FIG. 6 shows four DFT wave functions 602, 604, 606, 608 and the four lowest energy effective mass wave functions 610, 612, 614, 616 in real space. The value of a wave function at each grid point is illustrated in FIG. 6 by a dot; for higher function values, larger dots are assigned. The sign of the wave functions is illustrated in FIG. 6 by the contrast of the dots; darker dots correspond to a positive sign while lighter dots correspond to a negative sign. The DFT wave functions 602, 604, 606, 608 are selected by the projector function to best match the effective mass wave functions 610, 612, 614 and 616. As shown in FIG. 6, 602 matches 610, 604 matches 612, 606 matches 614, and 608 matches 616. It is clear from the figure that the global behavior of the matched wave functions is similar.

Returning to FIG. 5, if all the DFT bands in the considered low energy range, i.e., over a number of eVs, e.g., 1.2 eV, above the lowest energy, are not matched by an effective mass band, then the procedure is repeated in step 510. In the next iteration, at step 502, the procedure selects the lowest energy DFT band in the list of bands that is not matched. This unmatched lowest energy DFT band will be matched with the lowest level of another effective mass ladder and will be used to set up new trial wave functions. These new trial wave functions will be used to match remaining DFT bands. The procedure is continued until all considered DFT bands are matched. In this way, each effective mass ladder matches to a series of DFT bands.

Figure 7A:
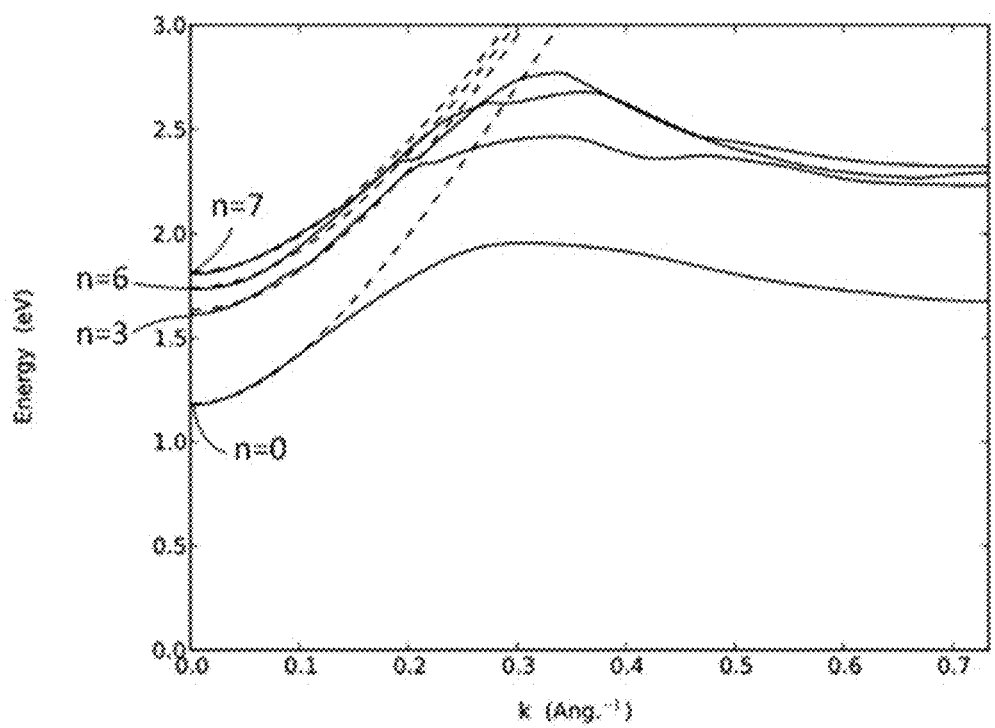
FIG. 7a illustrates an effective mass ladder. This ladder is formed by four density functional theory sub-bands around momentum k=0.
Figure 7B:
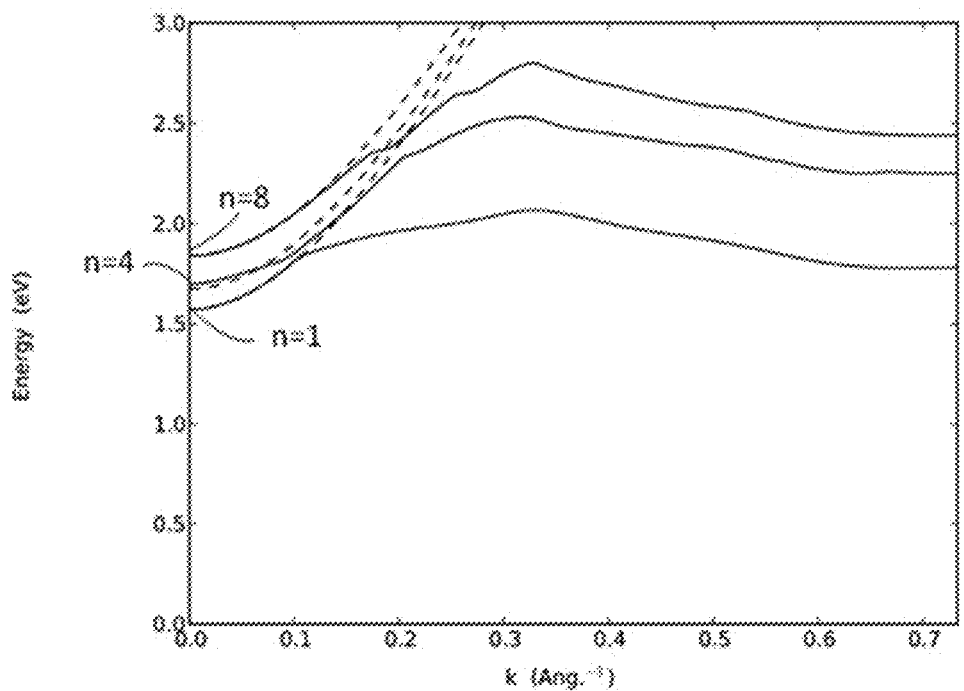
FIG. 7b illustrates another effective mass ladder. This second ladder is formed by three density functional theory sub-bands, again around momentum k=0.
Figure 7C:
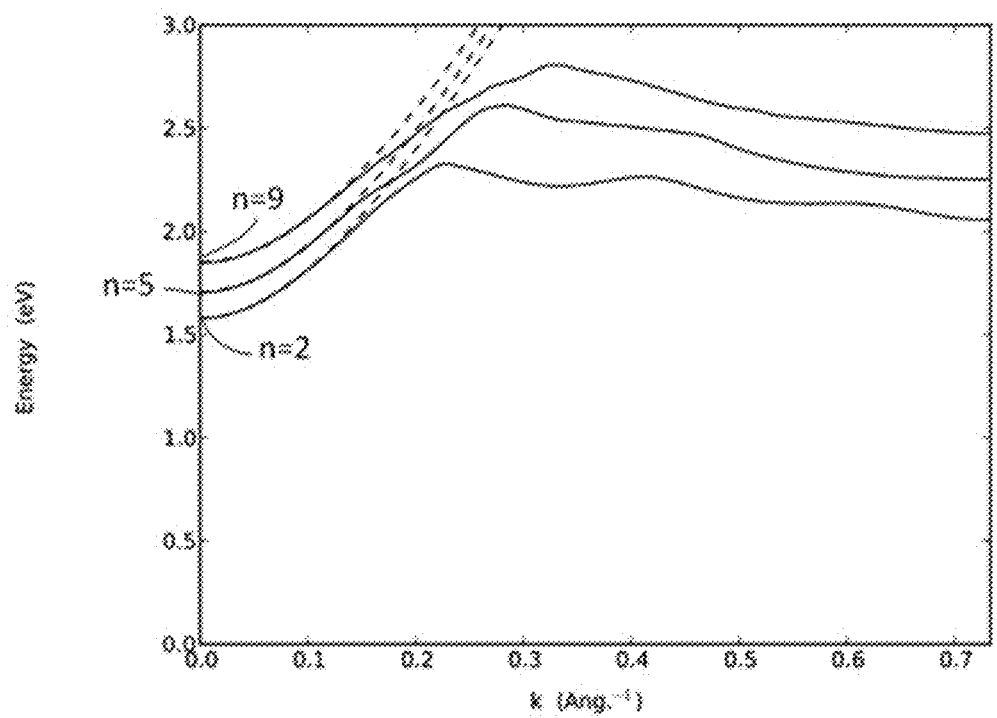
FIG. 7c illustrates another effective mass ladder. This third ladder is formed by another three density functional theory sub-bands again around momentum k=0.

FIGS. 7a-7c shows how the DFT bands from FIG. 3a have been matched with three different effective mass ladders. In other words, DFT bands of FIG. 3a have been split into three different series using the method described with reference to the method of FIG. 5 and each series corresponds to one effective mass ladder. When FIGS. 7a-7c are combined the result corresponds to all the bands shown in FIG. 3a.

FIG. 7a shows a ladder formed by the DFT bands n=0, n=3, n=6 and n=7. The FIG. 7b shows a ladder formed by the DFT bands n=1, n=4 and n=8 wherein the lowest band of the ladder (n=1) correspond to the first unmatched band, that is, the next iteration of the method of FIG. 5. FIG. 7c shows a ladder formed by the DFT bands n=2, n=5 and n=9, wherein the lowest band (n=2) of the ladder corresponds to the second unmatched band and thus, the third iteration of the method of FIG. 5.

In step 112 of FIG. 1 the parameters, e.g., the effective mass and non-parabolicity parameters, in each effective mass model are readjusted to obtain the best possible fit of the effective mass band energies to the DFT band energies. This is illustrated, e.g., in FIG. 7a, wherein the first effective mass model equation is fitted to the DFT bands, e.g., by simple curve fitting, and the result is shown with a dashed line.

Figure 8:
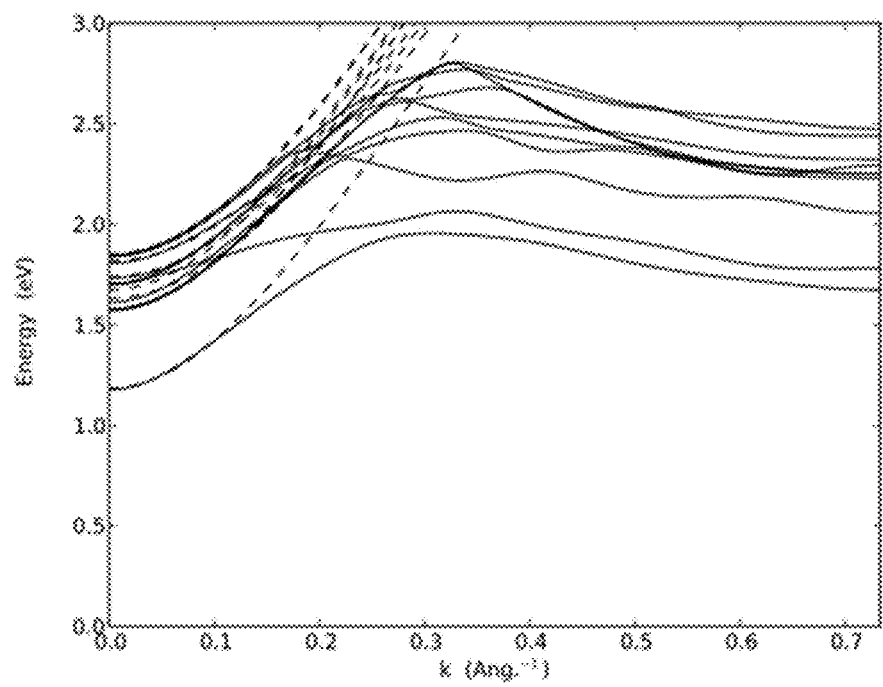
FIG. 8 illustrates the combined fit of the three effective mass models of FIGS. 7a-7c to the DFT band structure of FIG. 3 around momentum k=0.

FIG. 8 illustrates the combined fit of the three effective mass ladders of FIGS. 7a-7c to the DFT band structure of FIG. 3a.

The fitted effective mass models are the output of the algorithm and the objective of the present disclosure. The fitted effective mass models may be then used in material or device simulations, e.g., TCAD simulations. In the example of the disclosure, a DFT calculation has been used for the reference band structure calculation; however, the calculation could also be done with a semi-empirical or another first principles method. The semi-empirical methods could, for instance, be a tight-binding method, empirical pseudopotential method, or any other suitable method that can provide Eigen energies and wave functions for an atomic-scale model.

The material system of the example is, a 1-dimensional nanowire of Indium-Arsenic. Nevertheless, the method works for all systems that can be described by an atomic-scale model, for instance, a 2-dimensional, 3-dimensional, or any other suitable N-dimensional nanoscale system of any suitable material or combination of materials. The material system could also be an alloy of different elements where the elements are described using the virtual crystal approximation. In the virtual crystal approximation, an alloy between two elements is described by a new "virtual" element that has the average property of the two alloy elements.

For the approximate band structure model of the example an effective mass model has been used; however, this could also be another approximate model. The separation of the device bands into different series corresponding to different ladders allows for an automatized and less complex procedure to extract effective mass models from atomic-scale modeling that may be used in TCAD tools to simulate band structure data. Different models may now be used to approximate each series. One such example is an effective mass model with a non-parabolicity parameter and different effective masses in the different directions. In such a model:

$$(\varepsilon_{nk} - U_n)(1 + \alpha(\varepsilon_{nk} - U_n)) = \frac{\hbar^2(k_x - k_{x0})^2}{2m_x^*} + \frac{\hbar^2(k_y - k_{y0})^2}{2m_y^*} + \frac{\hbar^2(k_z - k_{z0})^2}{2m_z^*} + \varepsilon_{nk_0}, \quad (4)$$

where $U_n$ and $\alpha$ are the fitting parameters $(k_{x0}, k_{y0}, k_{z0})$ is the wave vector of the band minimum, and $(m_x^*, m_y^*, m_z^*)$ are the anisotropic effective masses.

Figure 9:
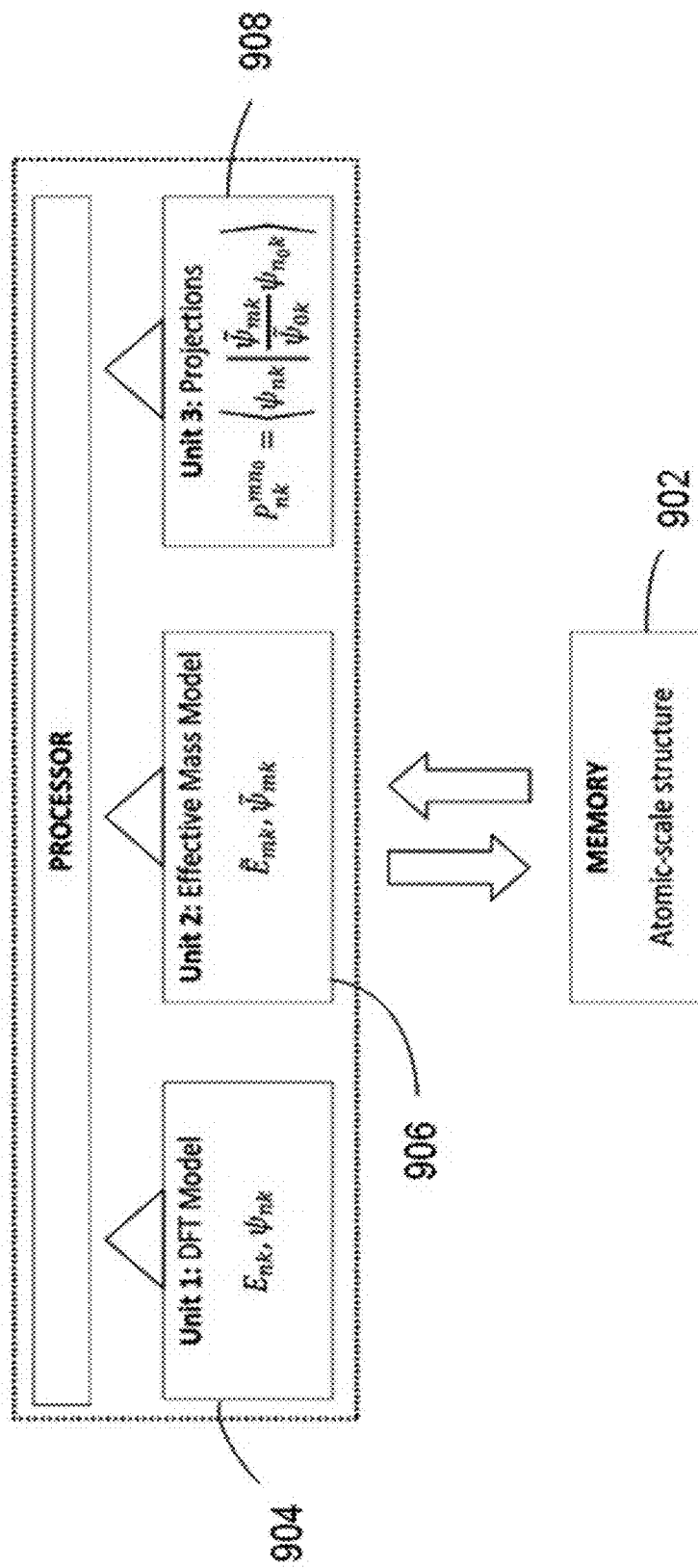
FIG. 9 illustrates a computer system having a processor with different processing modules and a memory according to an embodiment. The atomic-scale geometry resides in memory and the different processing modules handle the separate parts of the algorithm.

FIG. 9 shows an exemplary hardware implementation of the flowcharts in FIGS. 1 and 5. The atomic-scale geometry parameters may reside in a memory 902 and different processing units can access the data. There may be a specific processing unit 904 directed to generate or retrieve a DFT model. From said model the DFT band structure can be generated. Another processing unit 906 may generate an effective mass band structure. A third processing unit 908 may combine the DFT and effective mass wave functions to generate projector functions. Although these processing units are described as three separate units, they can be combined into one or two units, or further divided into additional processing units. Any other suitable processing units or combination of processing units can be used to access the atomic-scale geometry.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.
computer programs, particularly computer programs on or in a carrier, adapted for putting the system into practice.

Figure 10:
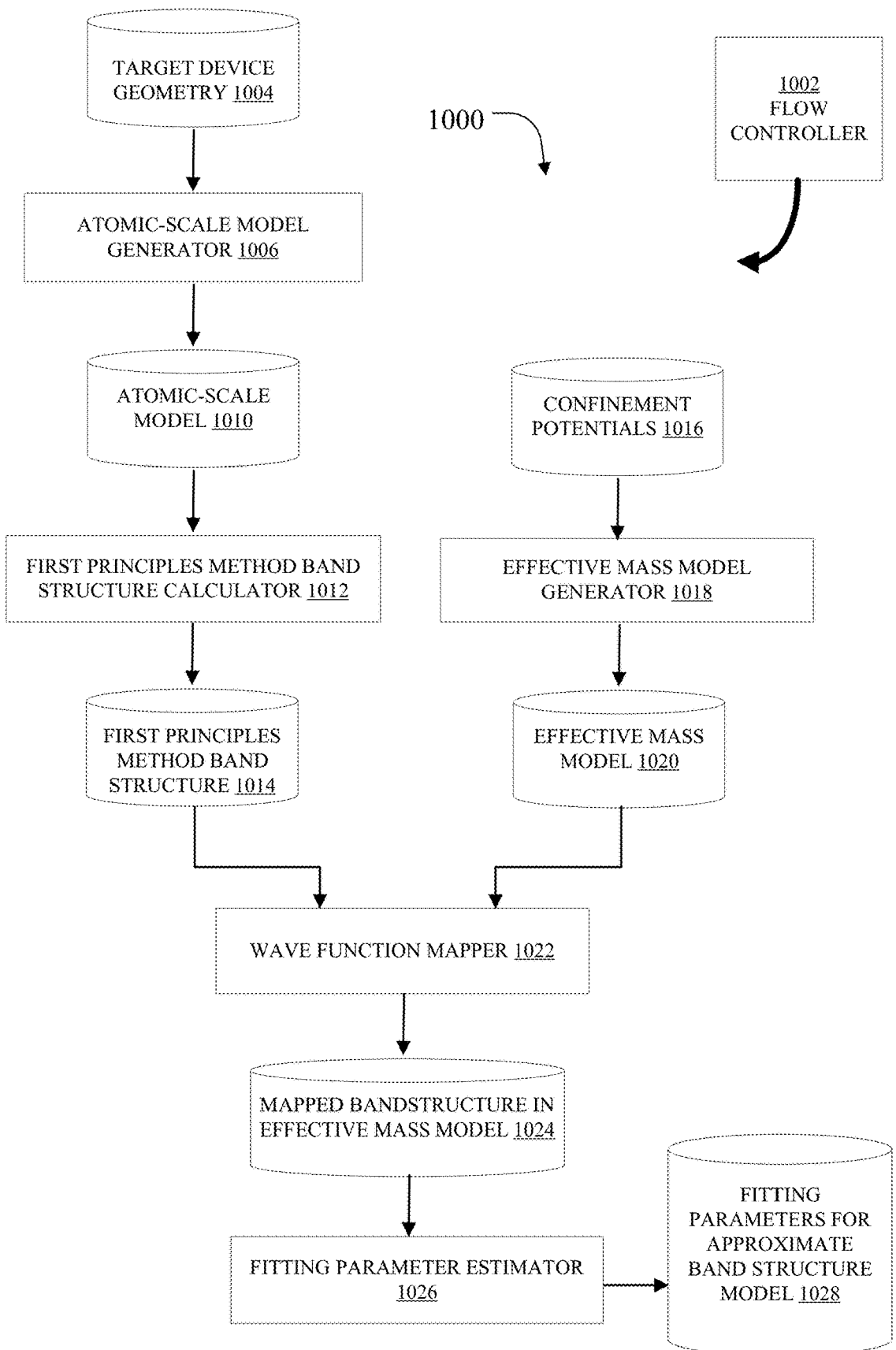
FIG. 10 illustrates the process flow and system to model a confined nanodevice according to an embodiment.

FIG. 10 illustrates an overall process flow and system 1000 to model a confined nanodevice according to aspects of the invention according to one embodiment. The process flow 1000 starts with a target device geometry in database 1004 in a computer readable medium. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 10, the database 1004 can be a single combination database, or a combination of two or more separate databases. The database 1004 can be stored on a hard drive or in a semiconductor memory or in one or more non-transitory computer readable media.

The target device geometry 1004 specifies dimensions and materials of a confined device. The target device geometry 1004 can be provided by any means. In one embodiment it is created manually, whereas in another embodiment it is created by simulating a series of predecessor process steps. In one embodiment, the target device geometry 1004 may represent the entire device. In one embodiment, the target device geometry 1004 may represent a part of the device, such as the Fin in a FinFET.

The atomic-scale model generator 1006 receives the target device geometry 1004 and generates an atomic-scale model 1010 of the confined nanodevice in dependence upon the target device geometry 1004. The atomic-scale model 1010 includes a position and element type of each individual atom of the confined nanodevice.

The First Principles Method (FPM) band structure calculator 1010 calculates the bandstructure 1012 of the atomic-scale model 1010 of the confined nanodevice. The first principles method band structure calculator 1010 may construct the Hamiltonian of the confined device using either FPM, semi-empirical methods, Density Functional Theory (DFT), or tight binding method. The calculated FPM method band structure 1012 includes FPM wave functions and FPM Eigen energies of the confined nanodevice.

The Effective Mass Model (EMM) generator 1018 generates an effective mass model 1020 of the confined device in dependence upon the confinement potentials 1016. Said confinement potential can, for example, be obtained from the effective potential of the FPM calculation. Confinement potentials for a bulk system may also be used. The effective mass Hamiltonian may now be diagonalized to generate the effective mass model 1020 that includes EMM wave functions and EMM Eigen energies.

The wave function mapper 1022 receives the FPM band structure 1012 and the effective mass model 1020. The wave function mapper 1022 maps one or more of the FPM wave functions to a corresponding one of the EMM wave functions as illustrated in FIG. 5.

In some implementations, the wave function mapper 1022 maps each n'th one of the FPM wave functions to a corresponding m'th one of the EMM wave functions by identifying the FPM wave function $\psi_{n_0 k}$ having the lowest energy of the calculated FPM band structure and the EMM wave function $\tilde{\psi}_{0k}$ having the lowest energy of the generated EMM. For each FPM wave function $\psi_{nk}$ (nano) of the calculated FPM band structure, the wave function mapper 1022 then identifies the corresponding EMM wave function $\tilde{\psi}_{mk}$ which best fulfills the following equation $$\frac{\psi_{nk}}{\psi_{n_0 k}} = \frac{\tilde{\psi}_{mk}}{\tilde{\psi}_{0k}}.$$

In some implementations, the wave function mapper 1022 maps each n'th one of the FPM wave functions to a corresponding m'th one of the EMM wave functions, by identifying the FPM wave function $\psi_{n_0 k}$ having the lowest energy of the calculated FPM band structure and the EMM wave function $\tilde{\psi}_{0k}$ having the lowest energy of the generated EMM. The wave function mapper 1022 iterates through the FPM wave functions n, from the wave function $\psi_{nk}$ having the lowest energy of the calculated FPM wave functions other than $\psi_{n_0 k}$, to the wave function $\psi_{nk}$ having the highest energy of the calculated FPM wave functions, and at each n'th iteration, finding the EMM wave function $\psi_{mk}$ with the largest projection $$P_{nk}^{mn_0} = \left\langle \psi_{nk} \middle| \frac{\tilde{\psi}_{mk}}{\tilde{\psi}_{0k}} \psi_{n_0 k} \right\rangle,$$

which is not already matched with another one of the FPM wave functions.

The wave function mapper 1022 outputs a mapped band structure in an effective mass model 1024. The fitting parameter estimator 1026 receives the mapped band structure in an effective mass model 1024 and estimates fitting parameters for an approximate band structure model 1026 of the confined nanodevice. The fitted parameters may be then used in material or device simulations, e.g., TCAD simulations.

In some implementations, an effective mass model may be used for the approximate band structure model, such as:

$$\varepsilon_{nk} = \frac{{}^2(k_x - k_{x0})^2}{2m_x^*} + \frac{{}^2(k_y - k_{y0})^2}{2m_y^*} + \frac{{}^2(k_z - k_{z0})^2}{2m_z^*} + \varepsilon_{nk_0}, \quad (5)$$

where $\varepsilon_{nk}$ is the electron energy of band number n, $(k_x, k_y, k_z)$ is the electron wave vector, is the reduced Planck constant, $\varepsilon_{nk_0}$ is the energy of the band minimum, $(k_{x0}, k_{y0}, k_{z0})$ is the wave vector of the band minimum, and $(m_x^*, m_y^*, m_z^*)$ are the anisotropic effective masses.

In some implementations, an effective mass model with a non-parabolicity parameter may be used, such as:

$$E = (\varepsilon_{nk} - U_n)(1 + \alpha(\varepsilon_{nk} - U_n)), \quad (6)$$

Where $\varepsilon_{nk}$ is the electron energy of band number n, and $U_n$ and $\alpha$ are the fitting parameters.

Referring to FIG. 10, the sequence of operation of the atomic-scale model generator 1006, the first principles method band structure calculator 1012, the effective mass model generator 1018, the wave function mapper 1022, and the fitting parameter estimator 1026 can be controlled automatically by a flow controller 1002. The flow controller 1002 may be a module that executes scripts to call each of the individual processing modules in the sequence set forth in FIG. 10, and defines the data flows among them. In an embodiment, each of the functional units 1002, 1006, 1012, 1018, 1022, and 1026 may be implemented as a separate, unitary, software or hardware module.

Figure 11:
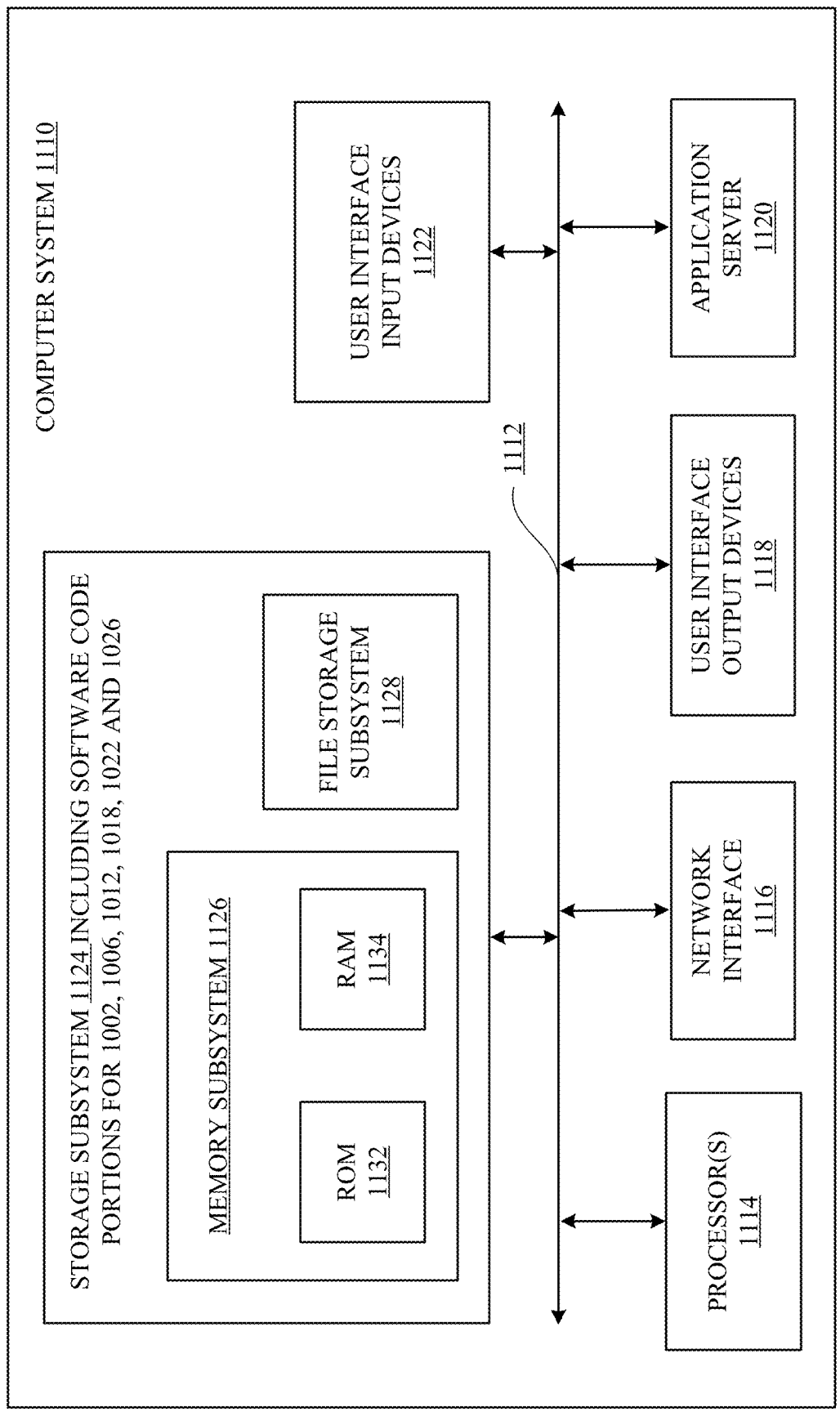
FIG. 11 is a simplified block diagram of a computer system.

FIG. 11 is a simplified block diagram of a computer system 1110 that can be used to implement any of the methods herein. Particularly it can be used to implement modules 1002, 1006, 1012, 1018, 1022 and/or 1026 in various embodiments. It also includes or accesses the databases 1004, 1010, 1014, 1016, 1020, 1024 and/or 1028.

Computer system 1110 typically includes a processor subsystem 1114 which communicates with a number of peripheral devices via bus subsystem 1112. These peripheral devices may include a storage subsystem 1124, comprising a memory subsystem 1126 and a file storage subsystem 1128, user interface input devices 1122, user interface output devices 1120, and a network interface subsystem 1116. The input and output devices allow user interaction with computer system 1110. Network interface subsystem 1116 provides an interface to outside networks, including an interface to communication network 1118, and is coupled via communication network 1118 to corresponding interface devices in other computer systems. Communication network 1118 may comprise many interconnected computer systems and communication links. These communication links may be wireline links, optical links, wireless links, or any other mechanisms for communication of information, but typically it is an IP-based communication network. While in one embodiment, communication network 1118 is the Internet, in other embodiments, communication network 1118 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1122 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1110 or onto computer network 1118.

User interface output devices 1120 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 1110 to the user or to another machine or computer system.

Storage subsystem 1124 stores the basic programming and data constructs that provide the functionality of certain embodiments of the present invention. For example, the various modules implementing the functionality of certain embodiments of the invention may be stored in storage subsystem 1124. These software modules are generally executed by processor subsystem 1114. The databases 1004, 1010, 1014, 1016, 1020, 1024 and 1028 may reside in storage subsystem 1124.

Memory subsystem 1126 typically includes a number of memories including a main random access memory (RAM) 1134 for storage of instructions and data during program execution and a read only memory (ROM) 1132 in which fixed instructions are stored. File storage subsystem 1128 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1128. The host memory 1126 contains, among other things, computer instructions which, when executed by the processor subsystem 1114, cause the computer system to operate or perform functions as described herein. As used herein, processes and software that are said to run in or on "the host" or "the computer", execute on the processor subsystem 1114 in response to computer instructions and data in the host memory subsystem 1126 including any other local or remote storage for such instructions and data.

Bus subsystem 1112 provides a mechanism for letting the various components and subsystems of computer system 1110 communicate with each other as intended. Although bus subsystem 1112 is shown schematically as a single bus, alternative embodiments of the bus subsystem may use multiple busses.

Computer system 1110 itself can be of varying types including a personal computer, a portable computer, a workstation, a computer terminal, a network computer, a television, a mainframe, a server farm, or any other data processing system or user device. Due to the ever changing nature of computers and networks, the description of computer system 1110 depicted in FIG. 11 is intended only as a specific example for purposes of illustrating the preferred embodiments of the present invention. Many other configurations of computer system 1110 are possible having more or less components than the computer system depicted in FIG. 11.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for modeling a confined nanodevice, the confined nanodevice being confined in at least one dimension, the method comprising:
    providing an atomic-scale model of the confined nanodevice, the atomic-scale model including a position and element type of each individual atom of the confined nanodevice;
    calculating a band structure of the confined nanodevice in dependence upon the atomic-scale model according to a First Principles Method (FPM), the calculated FPM band structure comprising FPM wave functions and FPM Eigen energies of the confined nanodevice;
    generating an effective mass model (EMM) of the confined nanodevice, wherein the EMM comprises EMM wave functions and EMM Eigen energies;
    mapping one or more of the FPM wave functions to a corresponding one of the EMM wave functions; and
    estimating in dependence upon said mappings, fitting parameters for an approximate band structure model of the confined nanodevice, wherein the fitting parameters are used in technology computer aided design (TCAD) simulations to simulate band structure data,
    wherein the mapping comprises identifying an FPM wave function $\psi_{n_0 k}$ having the lowest energy of the calculated FPM band structure, identifying an EMM wave function $\tilde{\psi}_{0k}$ having the lowest energy of the generated EMM and, for a particular FPM wave function $\psi_{nk}$ of the calculated FPM band structure, finding a corresponding EMM wave function $\tilde{\psi}_{mk}$ that best fulfills $$\frac{\psi_{nk}}{\psi_{n_0 k}} = \frac{\tilde{\psi}_{mk}}{\tilde{\psi}_{0k}}.$$

2. The method of claim 1, wherein providing an atomic-scale model of the confined nanodevice comprises:
    providing, accessibly to a computer system, a target device geometry for the confined nanodevice, the target device geometry indicating dimensions and materials of the confined nanodevice; and
    generating the atomic-scale model of the confined nanodevice in dependence upon the target device geometry.

3. The method of claim 1, wherein the electronic structure model of the confined nanodevice comprises a set of one or more equations of the form:

$$E = (\varepsilon_{nk} - U_n)(1 + \alpha(\varepsilon_{nk} - U_n))$$

where $\varepsilon_{nk}$ is the electron energy of band number n, and $U_n$ and $\alpha$ are the fitting parameters.

4. The method of claim 1, wherein calculating the FPM band structure comprises generating a Hamiltonian and using Bloch theorem to Fourier transform the Hamiltonian to calculate the FPM Eigen energies and FPM wave functions of the confined nanodevice as a function of a reciprocal wave vector (k) and a band index (n).

5. The method of claim 1, wherein generating the effective mass model of the confined nanodevice comprises using one or more confinement potentials.

6. The method of claim 1, wherein said mapping step comprises each n'th one of the FPM wave functions to a corresponding m'th one of the EMM wave functions, by:
    identifying the FPM wave function $\Psi_{n_0 k}$ having the lowest energy of the calculated FPM band structure and the EMM wave function $\tilde{\psi}_{0k}$ having the lowest energy of the generated EMM; and
    iterating through the FPM wave functions n, from the wave function $\Psi_{nk}$ having the lowest energy of the calculated FPM wave functions other than $\Psi_{n_0 k}$, to the wave function $\Psi_{nk}$ having the highest energy of the calculated FPM wave functions, and at each n'th iteration, finding the EMM wave function $\tilde{\psi}_{mk}$ with the largest projection $$P_{nk}^{m n_0} = \left\langle \psi_{nk} \left| \frac{\tilde{\psi}_{mk}}{\tilde{\psi}_{0k}} \psi_{n_0 k} \right\rangle \right.,$$

which is not already matched with another one of the FPM wave functions.

7. The method of claim 1, wherein calculating the FPM band structure of the confined nanodevice by FPM is performed by a semi-empirical method.

8. The method of claim 1, wherein calculating the FPM band structure of the confined nanodevice by FPM is carried out by Density Functional Theory (DFT).

9. The method of claim 1, wherein defining the atomic-scale model comprises establishing at least one periodic direction in which a Hamiltonian is calculated.

10. The method of claim 9, wherein calculating the FPM band structure of the confined nanodevice is obtained by the Bloch theorem in the periodic direction.

11. The method of claim 1, wherein the FPM wave functions are Fourier transformed to calculate spatial wave functions.

12. A system including one or more processors coupled to memory, the memory loaded with computer instructions for modeling a confined nanodevice that is confined in at least one dimension, the computer instructions, when executed on the one or more processors, implement actions comprising:

providing an atomic-scale model including a position and element type of each individual atom of the confined nanodevice;

calculating a band structure of the confined nanodevice in dependence upon the atomic-scale model according to a First Principles Method (FPM), the calculated FPM band structure comprising FPM wave functions and FPM Eigen energies of the confined nanodevice;

generating an effective mass model (EMM) of the confined nanodevice, wherein the EMM comprises EMM wave functions and EMM Eigen energies;

mapping one or more of the FPM wave functions to a corresponding one of the EMM wave functions; and estimating, in dependence upon said mappings, fitting parameters for an approximate band structure model of the confined nanodevice, wherein the fitting parameters are used in technology computer aided design (TCAD) simulations to simulate band structure data, wherein the mapping comprises identifying an FPM wave function $\psi_{n_0k}$ having the lowest energy of the calculated FPM band structure, identifying an EMM wave function $\tilde{\psi}_{0k}$ having the lowest energy of the generated EMM and, for a particular FPM wave function $\psi_{nk}$ of the calculated FPM band structure, finding a corresponding EMM wave function $\tilde{\psi}_{mk}$ that best fulfills $$\frac{\psi_{nk}}{\psi_{n_0k}} = \frac{\tilde{\psi}_{mk}}{\tilde{\psi}_{0k}}.$$

13. The system of claim 12, wherein the atomic-scale model is provided by:
providing, accessibly to a computer system, a target device geometry for the confined nanodevice, the target device geometry indicating dimensions and materials of the confined nanodevice; and
generating the atomic-scale model of the confined nanodevice in dependence upon the target device geometry.

14. The system of claim 12, wherein the electronic structure model of the confined nanodevice comprises a set of one or more equations of the form:

$$E=(\varepsilon_{nk}-U_n)(1+\alpha(\varepsilon_{nk}-U_n))$$

where $\varepsilon_{nk}$ is the electron energy of band number n, and $U_n$ and $\alpha$ are the fitting parameters.

15. The system of claim 12, wherein calculating the FPM band structure comprises generating a Hamiltonian and using Bloch theorem to Fourier transform the Hamiltonian to calculate the FPM Eigen energies and FPM wave functions of the confined nanodevice as a function of a reciprocal wave vector (k) and a band index (n).

16. The system of claim 12, wherein generating the effective mass model of the confined nanodevice comprises using one or more confinement potentials.

17. The system of claim 12, wherein said mapping one or more of the FPM wave functions to a corresponding one of the EMM wave functions comprises relating each n'th one of the FPM wave functions to a corresponding m'th one of the EMM wave functions, by:
identifying the FPM wave function $\Psi_{n_0k}$ having the lowest energy of the calculated FPM band structure and the EMM wave function $\tilde{\psi}_{0k}$ having the lowest energy of the generated EMM; and
iterating through the FPM wave functions n, from the wave function $\Psi_{nk}$ having the lowest energy of the calculated FPM wave functions other than $\psi_{n_0k}$ to the wave function $\Psi_{nk}$ having the highest energy of the calculated FPM wave functions, and at each n'th iteration, finding the EMM wave function $\tilde{\psi}_{mk}$ with the largest projection $$P_{nk}^{mn_0} = \left\langle \psi_{nk} \left| \frac{\tilde{\psi}_{mk}}{\tilde{\psi}_{0k}} \psi_{n_0k} \right\rangle \right.,$$

which is not already matched with another one of the FPM wave functions.

18. The system of claim 12, wherein calculating the FPM band structure of the confined nanodevice by FPM is performed by a semi-empirical method.

19. The system of claim 12, wherein calculating the FPM band structure of the confined nanodevice by FPM is carried out by Density Functional Theory (DFT).

20. The system of claim 12, wherein defining the atomic-scale model comprises establishing at least one periodic direction in which a Hamiltonian is calculated.

21. The system of claim 20, wherein calculating the FPM band structure of the confined nanodevice is obtained by the Bloch theorem in the periodic direction.

22. The system of claim 12, wherein the FPM wave functions are Fourier transformed to calculate spatial wave functions.

23. A non-transitory computer readable medium having stored thereon a plurality of instructions which when executed by a processor model a confined nanodevice when provided with an atomic-scale model of the confined nanodevice, the confined nanodevice being confined in at least one dimension and the atomic-scale model including a position and element type of each individual atom of the confined nanodevice, the plurality of instructions comprising instructions that cause the processor to:
calculate a band structure of the confined nanodevice in dependence upon the atomic-scale model according to a First Principles Method (FPM), the calculated FPM band structure comprising FPM wave functions and FPM Eigen energies of the confined nanodevice;
generate an effective mass model (EMM) of the confined nanodevice, wherein the EMM comprises EMM wave functions and EMM Eigen energies;
map one or more of the FPM wave functions to a corresponding one of the EMM wave functions; and
estimate, in dependence upon said mappings, fitting parameters for an approximate band structure model of the confined nanodevice, wherein the fitting parameters are used in technology computer aided design (TCAD) simulations to simulate band structure data,
wherein the mapping comprises identifying an FPM wave function $\psi_{n_0k}$ having the lowest energy of the calculated FPM band structure, identifying an EMM wave function $\tilde{\psi}_{0k}$ having the lowest energy of the generated EMM and, for a particular FPM wave function $\psi_{nk}$ the calculated FPM band structure, finding a corresponding EMM wave function $\tilde{\psi}_{mk}$ that best fulfills $$\frac{\psi_{nk}}{\psi_{n_0k}} = \frac{\tilde{\psi}_{mk}}{\tilde{\psi}_{0k}}.$$

24. The non-transitory computer readable medium of claim 23, wherein providing an atomic-scale model of the confined nanodevice comprises:
providing, accessibly to a computer system, a target device geometry for the confined nanodevice, the target device geometry indicating dimensions and materials of the confined nanodevice; and
a computer system generating the atomic-scale model of the confined nanodevice in dependence upon the target device geometry.

25. The non-transitory computer readable medium of claim 23, wherein the electronic structure model of the confined nanodevice comprises a set of one or more equations of the form:

$$E=(\varepsilon_{nk}-U_n)(1+\alpha(\varepsilon_{nk}-U_n))$$

where $\varepsilon_{nk}$ is the electron energy of band number n, and $U_n$ and $\alpha$ are the fitting parameters.

26. The non-transitory computer readable medium of claim 23, wherein calculating the FPM band structure comprises generating a Hamiltonian and using Bloch theorem to Fourier transform the Hamiltonian to calculate the FPM Eigen energies and FPM wave functions of the confined nanodevice as a function of a reciprocal wave vector (k) and a band index (n).

27. The non-transitory computer readable medium of claim 23, wherein generating the effective mass model of the confined nanodevice comprises using one or more confinement potentials.

28. The non-transitory computer readable medium of claim 23, wherein said mapping step comprises relating each n'th one of the FPM wave functions to a corresponding m'th one of the EMM wave functions, by:
identifying the FPM wave function $\Psi_{n_0k}$ having the lowest energy of the calculated FPM band structure and the EMM wave function $\tilde{\psi}_{0k}$ having the lowest energy of the generated EMM; and
iterating through the FPM wave functions n, from the wave function $\Psi_{nk}$ having the lowest energy of the calculated FPM wave functions other than $\Psi_{n_0k}$, to the wave function $\Psi_{nk}$ having the highest energy of the calculated FPM wave functions, and at each n'th iteration, finding the EMM wave function $\tilde{\psi}_{mk}$ with the largest projection $$P_{nk}^{mn_0} = \left\langle \psi_{nk} \middle| \frac{\tilde{\psi}_{mk}}{\tilde{\psi}_{0k}} \psi_{n_0k} \right\rangle,$$

which is not already matched with another one of the FPM wave functions.

29. The non-transitory computer readable medium of claim 23, wherein calculating the FPM band structure of the confined nanodevice by FPM is performed by a semi-empirical method.

30. The non-transitory computer readable medium of claim 23, wherein calculating the FPM band structure of the confined nanodevice by FPM is carried out by Density Functional Theory (DFT).

31. The non-transitory computer readable medium of claim 23, wherein defining the atomic-scale model comprises establishing at least one periodic direction in which a Hamiltonian is calculated.

32. The non-transitory computer readable medium of claim 31, wherein calculating the FPM band structure of the confined nanodevice is obtained by the Bloch theorem in the periodic direction.

33. The non-transitory computer readable medium of claim 23, wherein the FPM wave functions are Fourier transformed to calculate spatial wave functions.

* * * * *